May 9, 1944.  O. S. PETTY  2,348,411
METHOD FOR CORRELATING SEISMOGRAPHIC CURVES
Filed Feb. 8, 1941

Inventor
Olive S. Petty
By Watson, Cole, Grindle & Watson
Attorney

Patented May 9, 1944

2,348,411

UNITED STATES PATENT OFFICE 2,348,411

METHOD FOR CORRELATING SEISMOGRAPHIC CURVES

Olive S. Petty, San Antonio, Tex.

Application February 8, 1941, Serial No. 378,114

7 Claims. (Cl. 35—10)

This invention relates to a method of correlating seismograms, and has for one of its objects the provision of a method whereby two or more seismographic curves, which have been recorded on seismograms characterized by non-uniform spacing of the time-interval lines, due to shrinkage or other causes, may be transcribed to a common surface, said curves being at the same time corrected and converted to a common scale whereby their comparison is facilitated.

As is well known, a common method of geophysical exploration involves the step of detonating a charge of explosive on or at a suitable distance below the surface of the earth at the locality under exploration, the resulting seismic impulses being recorded on suitable instruments disposed at various adjacent points. The records thus obtained can then be correlated and compared to convey desired information concerning the substrata under investigation. The general method involved is well understood by those versed in the science of geophysical exploration, and need not be further described herein.

One type of instrument in common use for recording the seismic impulses resulting from an exploratory explosion is known as the string galvanometer. In this type of instrument, a photographic record is made of the movements of a member which is vibrated, by electrical means, in accordance with the seismic impulses generated by the explosive charge. The photographic record is inscribed on a sensitized film, or strip of sensitized paper, which moves across a projected light beam, the shadow cast by said vibrating member being displaced in accordance with the movements of such member.

The sensitized strip, being driven by the spring motor of the camera or photographic device, is subject to variations in speed, as a result of which the time-interval marks which are automatically inscribed thereon by means actuated at an absolutely uniform speed, may vary in distance from each other. A common variation is the result of the decreasing speed of the spring motor as the latter runs down, which causes the time-interval marks to be inscribed on the sensitized strip at constantly decreasing longitudinal intervals. Thus, the time-interval marks near the end of a record may be considerably closer together than those occurring near the beginning of the record. Another common cause of variations in the spacing of the time-interval marks lies in the unequal shrinkage of the sensitized strip which may occur during the developing process.

Seismograms which, for one reason or another, have obscuring or confusing interferences or disturbances may be difficult if not impossible to correlate without the use of the present method. Similarly, seismograms having varied spacing of the time-interval marks may be compared only with difficulty, but by the present method the seismographic curves may be corrected for such variations, and reduced to a commn scale, after which they may be easily compared.

It is also convenient to transcribe to a common surface, regardless of distortion, two or more seismograms for the more exact comparison of wave shapes. For example, it is sometimes desirable to compare a number of curves obtained in a given area at the same or different points by so transcribing these curves on a common surface that readily identifiable reference points common to each of the curves, such as points representative of the instant of arrival of a seismic impulse from a common bed, may be aligned. This permits of prompt identification of other reference points common to the several curves, and otherwise facilitates correlation of the curves.

Figure 1:
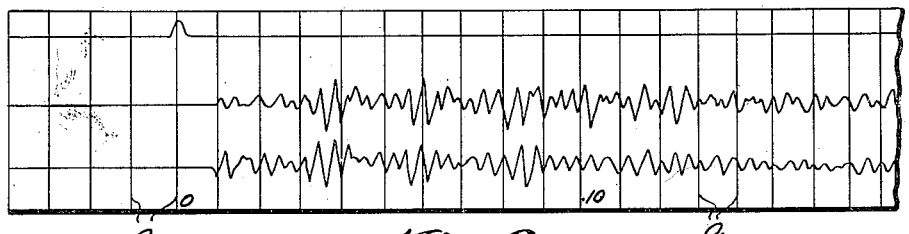
Figure 1 illustrates a seismogram or photographic record containing three curves, of which the first is a record of the time of the explosion and the other two are records corresponding to the seismic impulses received at two different points.
Figure 2:
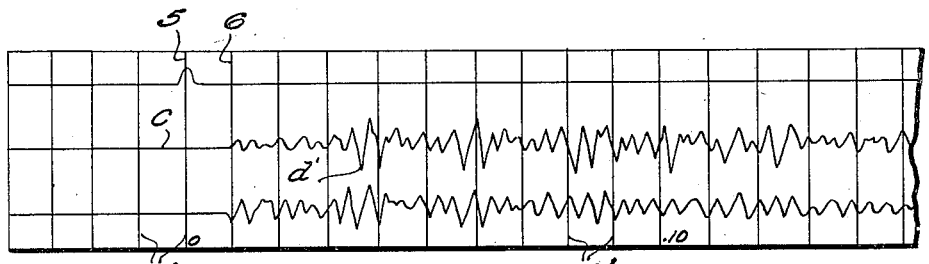
Figure 2 shows a similar seismogram, the time-interval lines of which are spaced farther apart than those of Figure 1, due to the fact that the sensitized strip was moving more rapidly in the case of Figure 2.

Referring to the drawing, it will be seen that the seismogram of Figure 1 is inscribed with transverse time-interval lines $a$, the space between two successive lines indicating a time interval, usually of $\frac{1}{100}$ of a second. The seismogram of Figure 2 is inscribed with time-interval lines $a'$, also representing time-intervals of $\frac{1}{100}$ of a second, but the lines $a'$ of Figure 2 are farther apart than the lines $a$ of Figure 1, due to the fact that the sensitized strip of Figure 2 was driven at a higher speed than that of Figure 1. It is obvious, therefore, that the seismographic curves traced on the seismogram of Figure 2 are on a different longitudinal scale than those of Figure 1. It will also be apparent that the scale changes in accordance with variations between the time-interval lines on the seismogram, which variations, as mentioned above, may be due to running down of the driving mechanism, or to other causes such as unequal shrinkage of different portions of the same or different strips during developing.

Two or more seismographic curves taken from the same or different seismograms may be correlated (i. e. reduced to a common and uniform scale) for purposes of comparison, by the method now to be described.

Figure 3:
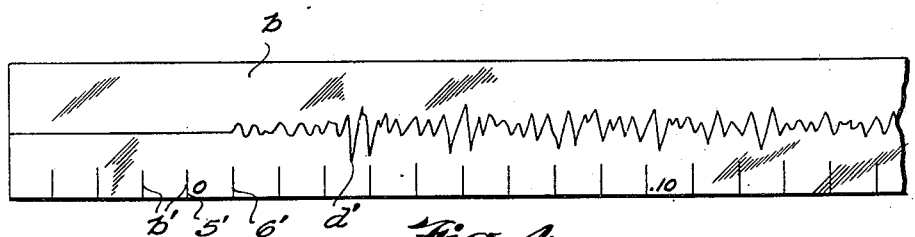
Figure 3 illustrates a template employed in the method of the present invention, one of the seismographic curves of Figure 2 having been transcribed onto said template by the method of the present invention.

A template $b$ is provided, as illustrated in Figure 3, which template is preferably of transparent material for purposes of convenience. The template $b$ is inscribed, by any suitable means, with time-interval marks $b'$ equi-distantly spaced from each other, and preferably spaced to correspond to the average spacing of the time-interval lines of the photographic records or seismograms. For example, the marks $b'$ of the template $b$ may be spaced ⅛ of an inch apart, each interval representing 1/100 of a second.

In transcribing the curve $c$ of Figure 2, for example, to the template $b$, the latter is placed over the seismogram of Figure 2 in such a manner that the first time-interval mark $b'$ of the template coincides with the first time-interval line $a'$ of the seismogram. The curve $c$ is then traced upon the surface of the template $b$, the latter being shifted lengthwise of the seismogram at frequent intervals and in small increments, or continuously, so that each portion of the transcribed record will have the same longitudinal relation to the adjacent time-interval marks of the template that the corresponding point of the original record had relative to the adjacent time-interval lines of the seismogram. That is to say, when the point $d$ of the seismogram is transcribed to the template as point $d'$, the template has been shifted along the seismogram until the fifth time-interval mark $b'$ of the template lies slightly to the right of the fifth time-interval mark $a'$ on the seismogram, and the sixth time-interval mark $b'$ of the template lies slightly to the left of the sixth time-interval line $a'$ of the seismogram. This disposition of the respective time-interval indicia is necessitated by the fact that the time-interval lines 5 and 6 of the seismogram are spaced more widely than the corresponding time-interval marks of the template. As the transcription of the curve continues, the template is successively shifted relative to the seismogram, in small increments, or continuously and smoothly, so as to reduce each part of the transcribed curve to a corrected and uniform longitudinal scale. The transverse scale of the curve, of course, remains unchanged. After the curve $d$ has been completely transcribed as the record $d'$ on the template, a second curve, either from the same or a different seismogram, is transferred to the same template by the method just described. Both curves will then be shown, side by side, on a common scale and may be easily compared without necessity of making any mental corrections. The two curves may then be said to be correlated.

As a variation of the above described technique, one or more of the curves to be compared may be transcribed to a transparent template in the manner set forth, others of said curves being similarly transcribed to a different template or templates, after which the respective curves or sets of curves may be very conveniently compared by superposing the several transparent templates. This method is especially important in connection with the detection of minute disconformities between corresponding graphs or curves, not only as to the time characteristics thereof but also as to wave form details. The original records cannot be successfully used for this purpose because of differences in the amount of shrinkage in developing, as mentioned above.

Figure 4:
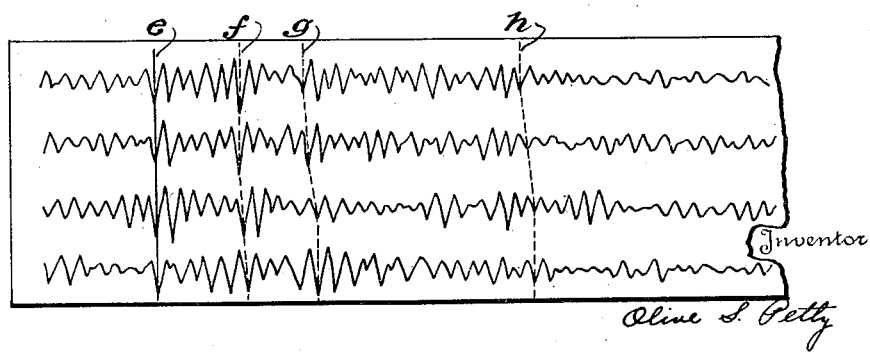
Figure 4 illustrates a further method of correlating several curves by transcribing the same on a common surface.

Turning now to Figure 4 of the drawing, it will be observed that a plurality of seismographic curves have been reproduced in such manner that distinctive reference points of the curves are aligned. This method preferably involves the use as a reference point of an impulse reflected from a more or less shallow horizon, the instants of arrival of this reflected reference wave being aligned, so that the comparative times of arrival of waves reflected from other horizons may be more readily determined.

Thus in Figure 4 the transcription of three curves has been effected in such manner that the points on the several curves which represent the instants of arrival of a reflected reference wave are aligned on the vertical line indicated at $e$. Lines are then drawn at $f$, $g$, and $h$ through further corresponding reflection impulses in each of the several curves, so that the deviation of these further reflecting horizons from the horizon represented by the line $e$ become readily apparent. It will thus be appreciated that in its broader aspect the instant invention is concerned with the transcription to a common surface of a plurality of seismographic curves, regardless of whether or not any time correction is required for reasons hereinbefore set forth.

It is obvious that the above described method may be employed for the purpose of correlating records obtained by various types of instruments, and the method defined in the appended claims is not intended to be limited to the correlation of any particular type of seismic curve, or to curves produced by any particular type of instrument.

Having thus described the invention what is claimed as new and desired to be secured by Letters Patent is:

1. In a method of geophysical exploration wherein a detonation is set off at a point in the earth's surface, the resulting seismic wave impulses recorded on seismograms, at one or more stations spaced from the point of detonation, in the form of seismographic curves, plotted across time-interval lines the spacing of which is either non-uniform or according to different scales of measurement, or subject to both such disconformities, and the several seismographic curves correlated: the steps of successively transcribing two or more of such curves onto a common surface having uniformly spaced time-interval indicia inscribed thereon, each of said curves being transcribed section by section, a section being the portion of the curve which lies between adjacent time-interval lines, each point on each section of each transcribed curve occupying the same relative position with respect to the bounding time-interval indicia on said common surface that the corresponding point of the original curve occupied relative to the adjacent time-interval lines on the original seismogram from which said curve was transcribed.

2. In a method of geophysical exploration wherein a detonation is set off at a point in the earth's surface, the resulting seismic wave impulses recorded on seismograms, at one or more stations spaced from the point of detonation, in the form of seismographic curves plotted across time-interval lines the spacing of which is either non-uniform or according to different scales of measurement, or subject to both such disconformities, and the several seismographic curves correlated: the steps of tracing two or more of such curves onto a transparent member having uniformly spaced time-interval indicia inscribed thereon, each of said curves being traced section by section, a section being the portion of the curve which lies between adjacent time-interval lines, continuously adjusting said transparent member along the original seismogram in the line of time increment while the tracing proceeds, said adjustment being at such a rate compared to the rate of tracing the curve that the next time-interval indicia on the transparent member will coincide with the corresponding time-interval line on the seismogram at the time the tracing of the curve reaches said line.

3. In a method of geophysical exploration wherein a detonation is set off at a point in the earth's surface, the resulting seismic wave impulses recorded on seismograms, at one or more stations spaced from the point of detonation, in the form of seismographic curves plotted across time-interval lines the spacing of which is either non-uniform or according to different scales of measurement, or subject to both such disconformities, and the several seismographic curves correlated: the steps of tracing two or more of such curves onto a transparent member having uniformly spaced time-interval indicia inscribed thereon, each of said curves being traced section by section, a section being the portion of the curve which lies between adjacent time-interval lines, continuously moving said transparent member along the original seismogram in the line of time increment while the tracing proceeds, said movement being at such a rate compared to the rate of tracing the curve that the next time-interval indicia on the transparent member will coincide with the corresponding time-interval line on the seismogram at the time the tracing of the curve reaches said line, the direction of movement of said transparent member being the same as that of the direction of tracing when the spacing of the time-interval indicia on the transparent member is smaller than that of the seismogram, and in the opposite direction when the spacing of the time-interval indicia of the transparent member is greater than that of the seismogram.

4. In a method of geophysical exploration wherein a detonation is set off at a point in the earth's surface, the resulting seismic wave impulses recorded on seismograms, at one or more stations spaced from the point of detonation, in the form of seismographic curves plotted across time-interval lines the spacing of which is either non-uniform or according to different scales of measurement, or subject to both such disconformities, and the several seismographic curves correlated: the steps of tracing one or more of such curves onto a transparent member having uniformly spaced time-interval indicia inscribed thereon, tracing others of said curves onto one or more additional similarly inscribed transparent members, each of said curves being traced section by section, a section being the portion of the curve which lies between adjacent time-interval lines, continuously adjusting said transparent member along the original seismogram in the line of time increment while the tracing proceeds, said adjustment being at such a rate compared to the rate of tracing the curve that the next time-interval indicia on the transparent member will coincide with the corresponding time-interval line on the seismogram at the time the tracing of the curve reaches said line, and superposing said transparent members for correlation of said curves.

5. In a method of geophysical exploration wherein a detonation is set off at a point in the earth's surface, the resulting seismic wave impulses including those received from various subsurface horizons recorded on seismograms, at one or more stations spaced from the point of detonation, in the form of seismographic curves, plotted across time-interval lines the spacing of which is either non-uniform or according to different scales of measurement, or subject to both such disconformities, and the several seismographic curves correlated: the steps of successively transcribing two or more of such curves onto a common surface having uniformly spaced time-interval indicia inscribed thereon, each of said curves being transcribed section by section, a section being the portion of the curve which lies between adjacent time-interval lines, each point on each section of each transcribed curve occupying the same relative position with respect to the bounding time-interval indicia on said common surface that the corresponding point of the original curve occupied relative to the adjacent time-interval lines on the original seismogram from which said curve was transcribed, starting each succeeding curve at points representing seismic impulses reflected from the same horizon as the corresponding point on the first curve transcribed and with said corresponding points in alignment, then locating the corresponding points on each curve representing the arrival of other impulses as from other horizons, and measuring the amount of any disalignment of said other corresponding points on the respective curves.

6. In a method of geophysical exploration wherein a detonation is set off at a point in the earth's surface, the resulting seismic wave impulses including those received from various subsurface horizons recorded on seismograms, at one or more stations spaced from the point of detonation, in the form of seismographic curves plotted across time-interval lines the spacing of which is either non-uniform or according to different scales of measurement, or subject to both such disconformities, and the several seismographic curves correlated: the steps of tracing one of such curves onto a transparent member having uniformly spaced time-interval indicia inscribed thereon, said curve being traced section by section, a section being the portion of the curve which lies between adjacent time-interval lines, continuously moving said transparent member along the original seismogram in the line of time increment while the tracing proceeds, said movement being at such a rate compared to the rate of tracing the curve that the next time-interval indicia on the transparent member will coincide with the corresponding time-interval line on the seismogram at the time the tracing of the curve reaches said line, the direction of movement of said transparent member being the same as that of the direction of tracing when the spacing of the time-interval indicia on the transparent member is smaller than that of the seismogram, and in the opposite direction when the spacing of the time-interval indicia of the transparent member is greater than that of the seismogram, marking on the template the distinctive reference points of the curve as from impulses reflected from various horizons, then tracing one or more additional curves based on the results of the detonation, by the same method, insuring that the points on the several curves representing seismic impulses reflected from one selected horizon are in transverse registry, and then determining the corresponding additional reference points on the other curves for comparison with those marked on the first curve transcribed.

7. In a method of geophysical exploration wherein a detonation is set off at a point in the earth's surface, the resulting seismic wave impulses recorded on seismograms, at one or more stations spaced from the point of detonation, in the form of seismographic curves, plotted across time-interval lines the spacing of which is either non-uniform or according to different scales of measurement, or subject to both such disconformities, and the several seismographic curves correlated: the steps of tracing one or more of such curves onto a transparent member having uniformly spaced time-interval indicia inscribed thereon, each of said curves being traced section by section, a section being the portion of the curve which lies between adjacent time-interval lines, continuously adjusting said transparent member along the original seismogram in the line of time increment while the tracing proceeds, said adjustment being at such a rate compared to the rate of tracing the curve that the next time-interval indicia on the transparent member will coincide with the corresponding time-interval line on the seismogram at the time the tracing of the curve reaches said line, the direction of adjusting movement of said transparent member being the same as that of the direction of tracing when the spacing of the time-interval indicia on the transparent member is smaller than that of the seismogram, and in the opposite direction when the spacing of the time-interval indicia of the transparent member is greater than that of the seismogram, and superposing said transparent member upon another of such seismographic curves for correlation of the traced curve with the last named other curve.

OLIVE S. PETTY.